INVENTORS
Richard D. Frazier
Gene L. Dafler
BY
Their Attorney

United States Patent Office 3,300,666
Patented Jan. 24, 1967

3,300,666
END FRAME–MAIN FRAME CONNECTION
Richard D. Frazier, Dayton, and Gene L. Dafler, New Lebanon, Ohio, assignors to General Motors Corporation, Detroit, Mich., a corporation of Delaware
Filed Oct. 28, 1963, Ser. No. 319,355
1 Claim. (Cl. 310—42)

This invention relates to throw-away dynamoelectric machine housing assembly and, more particularly, to inexpensive yet accurate maintenance of rotor to stator concentricity by unique interconnection of main and end frame components.

An object of this invention is to provide a new and improved end frame to main frame juncture utilizing a heat settable resinous filler material which eliminates need for costly machining of an outer peripheral edging of the end frame means as well as of an inner peripheral edging of the main frame means yet assuring maintenance of accurate concentricity between rotor and stator parts.

Another object of this invention is to provide a dynamoelectric housing assembly including an annular stator-supporting main frame having plural radial openings therethrough in locations adjacent to opposite axial ending thereof, end frame means for journaling a rotor concentrically with the stator and spaced inwardly from the main frame, and a filling of a predetermined quantity of curable resinous material in spacing between outer periphery of the end frame means and main frame ending as well as integrally into the radial openings so as to interconnect the main and end frame means free of need for machining thereof and free of any metal-to-metal fastening therebetween.

Another object of this invention is to provide a dynmoelectric machine housing assembly including a main frame having a radially perforated though un-machined end edging separated by a gap from cast end frame means having radially outwardly extending projections along outer edging thereof having an outer diameter less than inner diameter of the main frame, and a joint of injection moldable and curable filler material exemplified by epoxy and other suitable plastic resin of predetermined quantity forced into the gap at least radially between telescopically positioned main and end framed means such that at least the joint includes filler material partially under compression between the projections and end edging while air gap rotor to stator concentricity is maintained temporarily by shim means inserted and removable therebetween.

A further object of this invention is to assembly end frames to main frame means by a method including steps of positioning perforated end edging of the main frame means radially outwardly from outer periphery of the end frame regardless of irregularity of spacing therebetween, temporarily shimming air gap location between stator and rotor components, for accurate concentricity therebetween, fillinng radial spacing between the perforated edging of the main frame means and end frame with a curable resinous material as a joint free of any previously required machining, and removing the shimming to permit journaled rotor movement accurately and quietly as to the stator.

Another object of this invention is to provide assembly procedure for connecting main and end frame means of dynamoelectric machinery having stator and rotor components in steps including positioning of perforated edging of the main frame means radially outwardly from an irregular periphery of end frame means, temporarily shimming air gap location between stator and rotor components for accurate concentricity therebetween, injection molding and insulating extrudable resinous material to fill a gap between the main and end frames by supplying a predetermined quantity of such material to ooze under pressure through the perforated edging, and removing the shimming to leave an inexpensive though strong throw-away dynamoelectric machine frame assembly.

Further objects and advantages of the present invention will be apparent from the following description, reference being had to the accompanying drawings wherein a preferred embodiment of the present invention is clearly shown.

Figure 1:
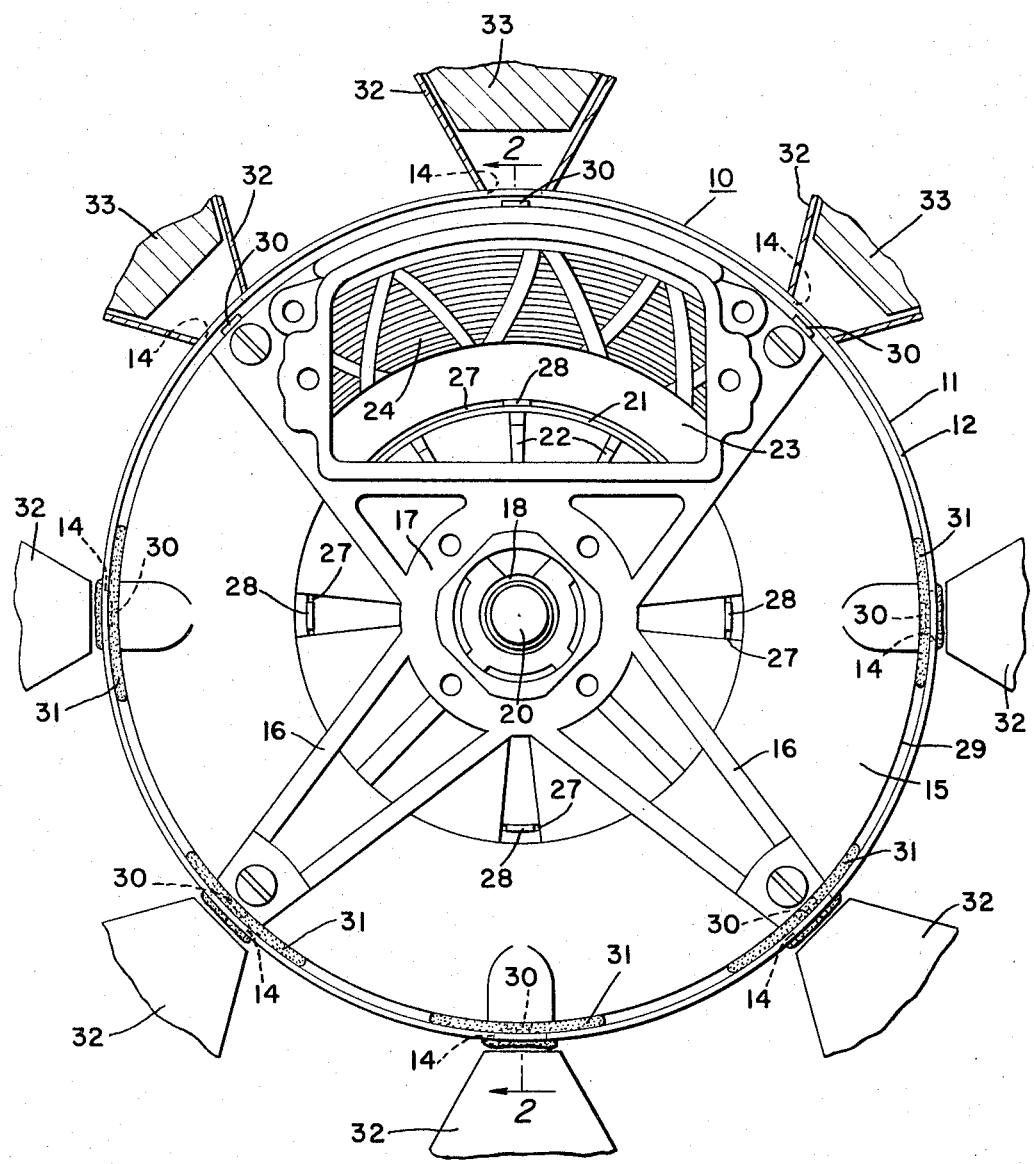
FIGURE 1 is an end view of a dynamoelectric machine having assembly features in accordance with the present invention.
Figure 2:
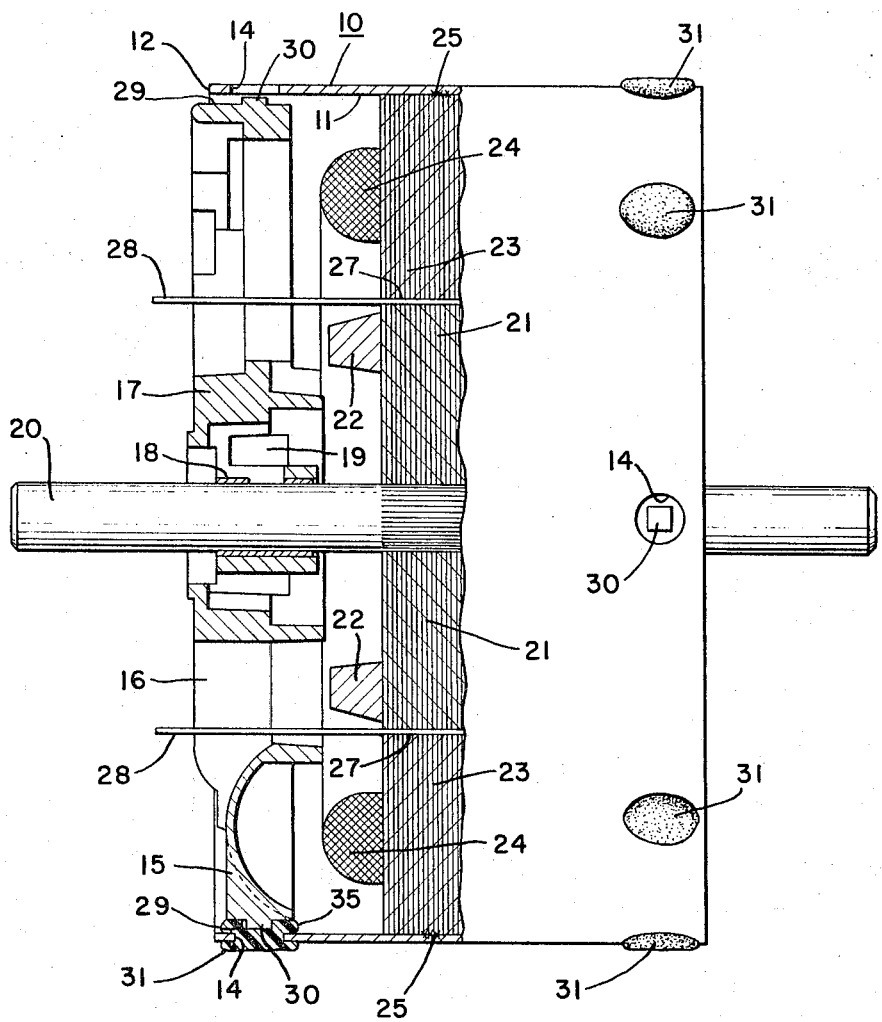
FIGURE 2 is a partial cross-sectional view taken along line 2—2 in FIGURE 1.

Dynamoelectric machinery such as indicated generally by numeral 10 in FIGURES 1 and 2 can be made to include a main frame means 11 substantially annular or otherwise in shape and having axial ending 12 thereof provided with plural transverse or radial openings 14 as can be seen in the drawings.

End frame means 15 can be made of cast metal including radially extending support or strut portions 16 which are integral with a central hub 17 carrying a bearing means 18 suitably to be lubricated by a wicking material (not shown) that can be filled into an annular cavity 19 on one side of the hub 17 as can be seen in FIGURE 2. A shaft 20 indicated in FIGURE 2 can be journaled as to the bearing means 18 for rotation of a squirrel-cage rotor component 21 having a well-known cast metal winding portion joined by integral opposite end ring means and optionally provided with radially-located and axially extending fan blade means 22 also of cast metal as indicated in FIGURE 2. This rotor portion or component 21 is located radially inwardly and operably associated with a stator portion or component 23 having a stator winding means 24 fitted to radial slots of the magnetic core of the station portion 23 in a well-known manner. The stator portion 23 can have an outer periphery thereof press-fitted into tight engagement with inner periphery of the main frame portion 11 subject to optional spot welding therebetween accomplished from radially outside the main frame portion 11 to hold the stator portion 23 in place. Such a spot weld location can be seen in FIGURE 2 and is designated by numeral 25. In FIGURE 1 of the drawings as well as in FIGURE 2 of the drawings relative positioning of the rotor means 21 and stator means 23 can be seen such that an air gap 27 or spacing therebetween is concentrically provided. In accordance with the present invention a procedure of maintaining this spacing or air gap 27 can be realized by positioning shim means 28 in predetermined positions between the inner periphery of the stator component 23 and the outer periphery of the rotor component 21. Plural reed-like shim means 28 can be provided including a minimum number of two thereof for a dynamoelectric machine having a horizontally journaled rotor component and at least three thereof in a vertically disposed rotor component is to be provided. However, in most situations it will be possible to provide four such shim means 28 for maintaining predetermined air gap 27 within a predetermined dimentional range. This shimming of the rotor component as to the stator portion simultaneously results in a predetermined radial positioning of the end frame means 15 due to journaling and engagement of the shaft portion 20 of the rotor component 21 as to the bearing means 18 and hub portion 17. Thus, simultaneously there is a predetermined concentric locating and spacing between an outer peripheral edging 29 of the end frame means located radially inwardly from the axial ending 12 of the main frame portion 11.

Integral with the cast end frame means 15 and projecting radially outwardly therefrom in accordance with the present invention there are plural lugs or projections 30 which are substantially radially in alignment with the openings 14 through the axial ending 12 of the main frame means 11. These lugs or projections 30 can be provided with a square cross section in contrast to round openings 14 subject to extrusion of a resinous filler means or material 31 of which a predetermined quantity is injected through the main frame openings 14. This resinous means or material can be supplied through a suitable nozzle means 32 and plunger portion 33 cooperable therewith and indexable concurrently to each of the openings 14 and in substantial radial alignment therewith so that there is a filling of the space between the outer periphery 29 of the end frame means 15 and an inner periphery of the axial ending 12 of the main frame means. As can be best seen in a lower portion of FIGURE 2, this resinous material which may be epoxy, polyamide, polyvinyl chloride, polytetrafluoroethylene, acrylic, acetal resin and the like so as to provide a moldable yet curable mass which will resiliently support the end frame means as to the main frame means without requiring any machining therebetween. Thus, the resinous material 31 can accomplish a considerable saving in time and labor. The resinous material is molded and cured into place while maintaining the shimming by placement of the shim means 28 subject to removal of the latter upon setting up of the resin filler material between the end frame means and main frame means. The opening such as 14 in each of the main frame end locations can be readily punched or stamped in the main frame portion since accuracy in these dimensions is unnecessary as long as the shim means maintains the proper air gap 27. The shim means hold the stator and rotor components concentric to each other during extruding of the filler material. An advantage of this procedure is that the end frame tenon and main frame tenon require no machining as previously encountered. However, it is advisable to provde plural shim means inserted into the air gap 27 to hold concentricity between the rotor and stator components during molding and curing of the filler material or resin 31.

In the event an epoxy resin is used it is possible to have this in a semi-cured or B-stage condition for a controlled rate of setting or polymerization for a time period of up to 24 hours under atmospheric conditions or faster subject to heating in an oven. Suitable curing agents can be mixed with the epoxy resin for accelerating the curing thereof. Viscosity of the resinous material is such that an oozing out can occur axially between the end frame means and the main frame means. However, only a predetermined quantity of such resin material is measured out at a time and thus axial confining of the resinous flow between the end frame means and main frame means particularly along an inward annular portion 35 as indicated in FIGURE 2 is unnecessary. A total of eight openings 14 and complementary projections 30 can be seen in the view of FIGURE 1 though it is to be understood that differing numbers of complementary openings and projections greater than three in number can be provided. It is to be understood that the projections 30 extend radially outwardly to a location slightly less than internal diameter of the main frame means though at any time there is a thrust or radial force applied at least some of the resinous material will be partially under compression between the edging of the openings 14 and the lugs or projections 30. Use of the injection moldable and curable resinous material permits considerable reduction in cost such that in effect there is provided a throw-away dynamoelectric machine frame means. The filler material 31 can be cured under atmospheric conditions subject to optional additional heating to expedite the setting and positioning of the end frame means 15 as to the main frame means 11 at one or both ends of the dynamoelectric machine housing. The resinous material 31 provides a juncture which is resiliently maintained so as to reduce transmission of rotor noise or vibrations by way of the shaft 20 to the bearing means 18 and end frame outwardly to the main frame 11 which can be suitably mounted on a support of an appliance and the like wherein the dynamoelectric machine is installed for powering purposes. In effect the resinous material can provide sufficient resilience as an annular shock absorber in effect located directly radially between an outer periphery of the end frame means and an ending of the main frame means.

While the embodiments of the present invention as herein disclosed constitute a preferred form, it is to be understood that other forms might be adopted.

What is claimed is as follows:

In a dynamoelectric machine housing assembly having an annular stator-supporting main frame and end frame means telescopically fitted radially inwardly from the main frame for journalling a rotor concentrically with the stator improvement which comprises; plural radially outwardly extending projections in isolated locations along the outer periphery of each end frame means, said projections having diametric distance less than the inner diameter of the main frame, plural radial openings through the main frame in isolated locations adjacent to axial ends of the main frame and specifically radially in alignment with said projections, and radially localized fillings of a predetermined quantity of resinous injection moldable and cured epoxy material individually disposed in the spacing between said projections and the corresponding radial openings of the main frame, said projections having juncture with the epoxy material that per se extends integrally into said radial openings exclusively assuring resilient maintenance of accurate concentricity between the rotor and the stator as well as between the telescopically fitted end frame and main frame means respectively.

References Cited by the Examiner
UNITED STATES PATENTS

| | | | |
|---|---|---|---|
| 2,685,658 | 8/1954 | Feiertag | 310—42 |
| 2,716,710 | 8/1955 | Thompson | 310—258 |
| 2,731,575 | 1/1956 | Hershberger | 310—90 |
| 3,002,261 | 10/1961 | Avila | 29—155.5 |
| 3,145,313 | 8/1964 | Tupper | 310—42 |
| 3,165,816 | 1/1965 | Thompson | 29—155.5 |
| 3,167,672 | 1/1965 | Tupper | 310—90 |
| 3,172,197 | 3/1965 | Rutledge | 29—155.5 |
| 3,176,172 | 3/1965 | Thompson | 310—42 |

MILTON O. HIRSHFIELD, *Primary Examiner.*

J. W. GIBBS *Assistant Examiner.*